United States Patent
Burd

(10) Patent No.: US 9,868,080 B2
(45) Date of Patent: Jan. 16, 2018

(54) COMPACT PLUMBING SYSTEM DRAIN STRAINER FOR A GALLEY

(71) Applicant: B/E AEROSPACE, INC., Wellington, FL (US)

(72) Inventor: Peter John Leslie Burd, Carmarthenshire (GB)

(73) Assignee: B/E Aerospace, Inc., Wellington, FL (US)

( * ) Notice: Subject to any disclaimer, the term of this patent is extended or adjusted under 35 U.S.C. 154(b) by 247 days.

(21) Appl. No.: 14/463,968

(22) Filed: Aug. 20, 2014

(65) Prior Publication Data

US 2015/0060338 A1 Mar. 5, 2015

Related U.S. Application Data

(60) Provisional application No. 61/872,364, filed on Aug. 30, 2013.

(51) Int. Cl.

| | | |
|---|---|---|
| *B01D 35/02* | (2006.01) | |
| *B01D 35/30* | (2006.01) | |
| *B01D 35/153* | (2006.01) | |
| *B01D 35/157* | (2006.01) | |
| *E03C 1/26* | (2006.01) | |
| *E03C 1/264* | (2006.01) | |
| *E03C 1/298* | (2006.01) | |
| *B63B 29/16* | (2006.01) | |
| *B64D 11/02* | (2006.01) | |

(52) U.S. Cl.
CPC ........... *B01D 35/02* (2013.01); *B01D 35/153* (2013.01); *B01D 35/1573* (2013.01); *B01D 35/30* (2013.01); *B63B 29/16* (2013.01); *B64D 11/02* (2013.01); *E03C 1/26* (2013.01); *E03C 1/264* (2013.01); *E03C 1/298* (2013.01)

(58) Field of Classification Search
CPC .. B01D 35/02; B01D 35/153; B01D 35/1573; B01D 35/30; E03C 1/26; E03C 1/264; E03C 1/298
USPC .................................. 210/85, 435, 136, 454
See application file for complete search history.

(56) References Cited

U.S. PATENT DOCUMENTS

| | | | |
|---|---|---|---|
| 1,817,376 A | 8/1931 | Izquierdo | |
| 4,179,762 A * | 12/1979 | Barnhardt | E03C 1/282 137/247.51 |

(Continued)

FOREIGN PATENT DOCUMENTS

| | | |
|---|---|---|
| CN | 201512856 | 6/2010 |
| DE | 10242168 A1 | 3/2004 |

(Continued)

OTHER PUBLICATIONS

International Search Report, dated Nov. 17, 2014, 5 pages, from PCT/US2014/053005, published as WO 2015/031535 on Mar. 5, 2015.

(Continued)

*Primary Examiner* — Robert Clemente
*Assistant Examiner* — Akash Varma
(74) *Attorney, Agent, or Firm* — Donna P. Suchy

(57) ABSTRACT

A apparatus and system for filtering wastewater from a basin is disclosed, wherein the apparatus prevents backflow of waste water, provides easy access for cleaning and replacing strainers, and a viewing window. The apparatus also provides additional ports for draining the apparatus.

16 Claims, 2 Drawing Sheets

(56) References Cited

U.S. PATENT DOCUMENTS

| | | | | |
|---|---|---|---|---|
| 5,372,718 A | * | 12/1994 | Zebian | ................. B01D 29/117 |
| | | | | 210/301 |
| 2003/0024568 A1 | * | 2/2003 | Bowman | ................ B01D 61/10 |
| | | | | 137/217 |
| 2004/0040597 A1 | * | 3/2004 | Cheng | ..................... F16L 55/24 |
| | | | | 137/247.51 |
| 2006/0085930 A1 | | 4/2006 | Eldridge | |

FOREIGN PATENT DOCUMENTS

| | | |
|---|---|---|
| FR | 676284 A | 2/1930 |
| JP | H02137994 A | 5/1990 |
| JP | H0681608 U | 11/1994 |
| JP | H06306908 A | 11/1994 |
| JP | H09225657 A | 9/1997 |
| JP | H10165716 A | 6/1998 |
| JP | 2002336625 A | 11/2002 |

OTHER PUBLICATIONS

Office Action and Search Report of Chinese Patent Application No. 2014800459275, dated Sep. 7, 2016, 16 pages total (English Translation Only).

\* cited by examiner

COMPACT PLUMBING SYSTEM DRAIN STRAINER FOR A GALLEY

CROSS-REFERENCES TO RELATED APPLICATIONS

This application is based upon and claims priority from U.S. Application No. 61/872,364, filed Aug. 30, 2013, incorporated by reference in its entirety.

BACKGROUND

This invention relates generally to a wastewater plumbing system for a galley, and more particularly relates to a filtration device for wastewater from a galley's food preparation area.

Large commercial passenger-carrying vehicles, such as, aircrafts, trains, and ships, are typically equipped with food and beverage preparation areas sometimes referred to as a galley. Traditionally galleys are equipped with a catch basin to allow convenient disposal of waste fluids. Due to limited spacing, a catch basin is sometimes simply a grated hole on a countertop leading to waste plumbing. Due to the compact design of catch basins, it is important that the galley maintains a versatile plumbing system that remains clog free and prevents waste backflow from spilling up from out of the basin. To prevent clogs, galleys often use removable drain strainers that strains debris and particulates from the waste fluids.

Though prior art drain strainers are sufficient, improvements can still be made. For example, when there are clogs in the wastewater plumbing system, it is difficult to determine whether the drain strainer needs cleaning or whether the problem is somewhere else down the line. Clogs also make removing the strainer messy and unsanitary by spilling fluid that is backed up within the strainer. Additionally, when there is fluid backup or movement of the passenger-carrying vehicles, the waste fluid can sometimes overflow or surge back up the basin. This is particularly a problem when the basin has been miniaturized to essentially a grated hole on a countertop. Overflow and back surges of waste fluid may easily contaminate countertops and create an unsanitary galley. Furthermore, because of the compact nature of passenger-carrying vehicles, decreasing the footprint of galley equipment is highly desirable.

Therefore, there is a need for a strainer which prevents wastewater backflow that is smaller than the traditional strainers and allows for visual inspection and drainage.

SUMMARY OF THE INVENTION

In its most general aspect, the invention includes an apparatus for a compact robust wastewater filtering system which allows internal viewing, a bypass system, and a system for preventing backflow of wastewater.

In another aspect, the invention provides a wastewater filtration assembly which provides options for a user to de-clog the assembly by way of an additional input/output port, and/or a door or removable panel that provides access to the internal parts of the wastewater filtration assembly.

In yet another aspect, the invention provides a strainer that doubles as a wastewater backflow prevention mechanism, such as a buoyant spherical device.

In still another aspect, the invention provides a simplified filtration system by attaching a strainer to a removable panel or door.

In another aspect of the invention, a filtration assembly with an emergency drain port is provided.

Other features and advantages of the present invention will become apparent from the following detailed description, taken in conjunction with the accompanying drawings, which illustrate, by way of example, the principles of the invention.

DETAILED DESCRIPTION OF THE PREFERRED EMBODIMENTS

Figure 1:
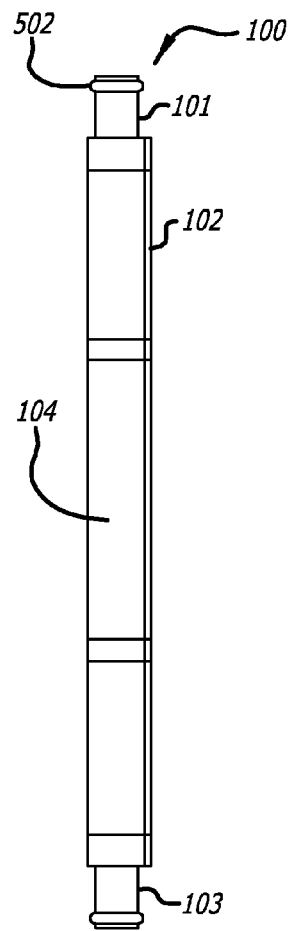
FIG. 1 is a side view of a filter assembly according to an embodiment of the present invention.

Referring to the drawings, which are provided by way of example, and not by way of limitation, the present invention provides for a strainer or filter with a reduced footprint, that may also provide one or more of the following advantages: a mechanism to prevent back flow or back splash, an emergency drain, a window for visual inspection, and a door or removable panel for easy access within the strainer.

FIG. 1 illustrates a filter assembly 100 viewed from the side according to an embodiment. At the top of filter assembly 100 is an input connecter or port 101. The input connector or port maybe be a tubular and hollow pipe like device for receiving wastewater from a basin. The input connector or port 101 may have an opening at the top of input connector or port 101 which allows for liquids to pass through and into the body 104 of the filter assembly 100. Access panel 102 may be a door movably secured to the body, or a removable panel or the like that provides access into the interior of filter assembly 100. A first or main output connector or port 103 may a tubular opening which allows liquid waste from within the filter assembly 100 to be discharged into the rest of the galley's waste plumbing.

Figure 2:
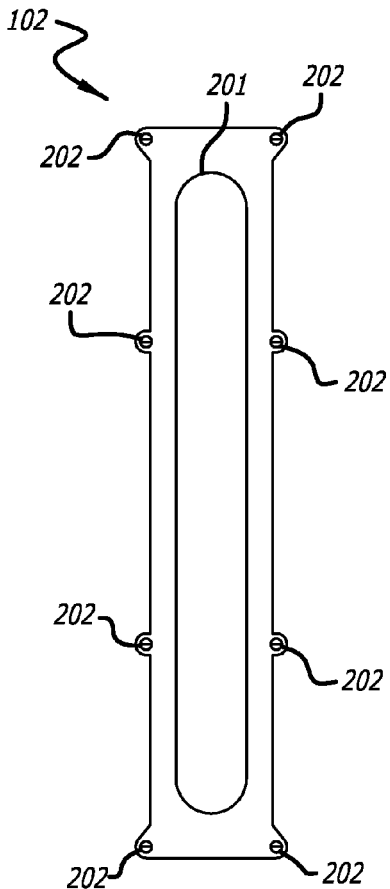
FIG. 2 is a front view of a removable panel of the filter assembly of FIG. 1.

FIG. 2 illustrates the access panel 102 viewed from the front according to an embodiment. Access panel 102 may have a window 201 which allows for easy viewing within the body of filter assembly when attached. Window 201 may be made of any clear material such as plastic, Plexiglas, glass, sapphire, or the like, for example. This allows a person to easily determine whether there is a clog and whether such a clog is within the filter assembly. Panel 102 may also have fasteners 202 such as screws or bolts, which allow for access panel 102 to be movably or removably attached to the body of the filter assembly 100.

Figure 3:
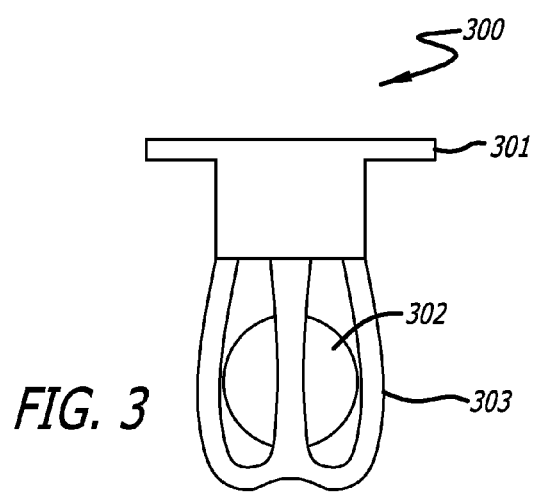
FIG. 3 is an illustration of a strainer for use in a filter assembly of FIG. 1.

FIG. 3 illustrates a filter or strainer 300 of the filter assembly. A filter or strainer 300 may have a connector or flange 301 for attaching the strainer to the input connector or port of the filter assembly. The connector or flange 301 of the filter or strainer 300 may be configured for having the input connector or port of the filter assembly inserted into it. Either the input connector port or the filter or strainer 300 may have a flange and corresponding slots for ensuring a snug and watertight fit.

As is illustrated in FIG. 3, the filter or strainer 300 may also have a ball 302 movably contained within a ball cage 303, which is configured as a ball valve. Ball 302 may be configured to be buoyant. Ball 302 may be made of a single buoyant material such as foam, plastic, and the like. Alternatively, ball 302 may be made of generally non-buoyant material such as most metals, but can be made buoyant by having a hollowed center. It would be readily apparent to an ordinary skilled artisan to employ an alternative means of providing a spherical flotation device in a ball valve, and other similar ball valves or check valves are contemplated as part of this invention. Ball 302 may have a diameter that is larger than connector 301 such that if the ball covered connector 301, liquid would be unable to pass. Cage 303 may surround ball 302 to entrap or retrain ball 302, but still allow vertical movement towards and away from connector 301. The combination of ball 302 and ball cage 303 may act as a backflow and back surge prevention device by forming a one-way valve. Liquid can pass out the bottom of connector 301, but if liquid were to rise from below, ball 302 would rise on top of the liquid and be guided at least partially into connector or flange 301 by cage 303. Thus, ball 302 and cage 303 prevents liquid from passing into connector or flange 301 from below.

Alternatively ball cage 303 may be have finer or smaller holes for filtering smaller debris and particulate from passing through the filter assembly. Ball cage 303, if used as a fine strainer, may be made of metal such as a stainless steel mesh, plastic, paper, recycled materials, and any other suitable porous materials. Alternatively, ball cage 303 may only filter large debris from passing through the holes provided.

The filter or strainer 300 may connect to or attach to the filter assembly's access panel or door, which may simplify replacing or cleaning the filter or strainer 300. The filter or strainer 300 may be made to be readily and cost effectively disposable.

Figure 4:
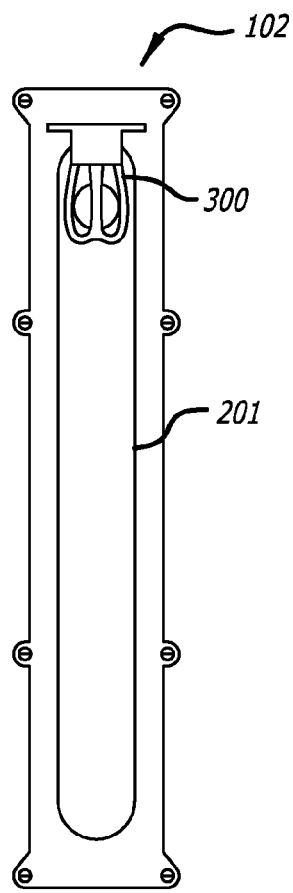
FIG. 4 is a rear view of a removable panel of the filter assembly of FIG. 1, showing a strainer attached to the door.

FIG. 4 illustrates the back view of a filter assembly access panel or door with a filter or strainer attached. The access panel or filter assembly door may provide a clip or insert which allows the attachment and detachment of the filter or strainer. The filter assembly access panel or door may have a window that extends above at least part of the filter or strainer, thus providing a view of the filter or strainer. Accordingly, a user may observe whether the filter strainer needs cleaning without opening the filter assembly.

Figure 5:
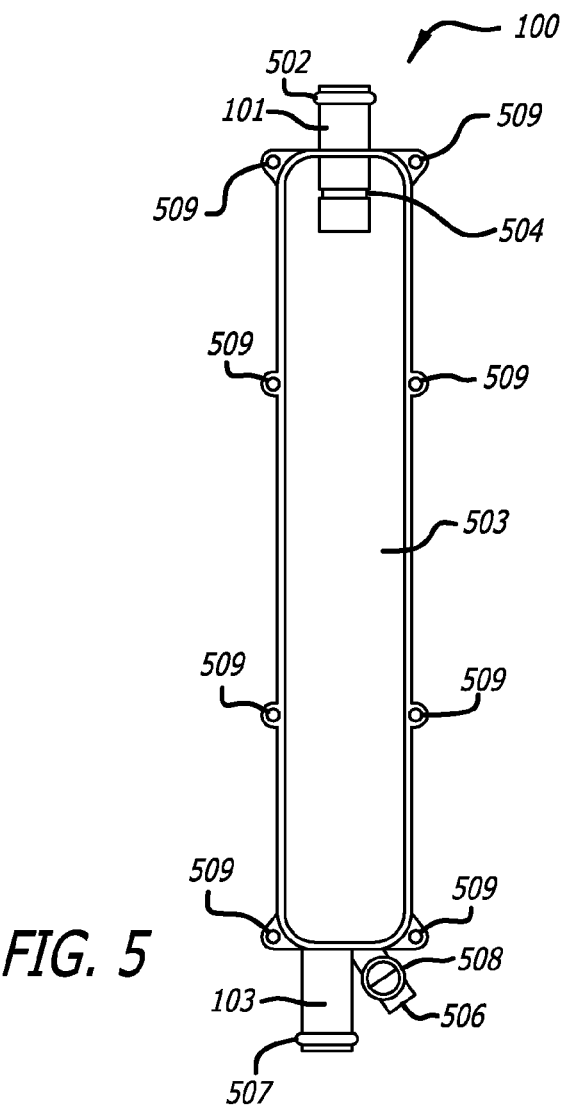
FIG. 5 is a front view of the filter assembly of FIG. 1 with its panel removed.

FIG. 5 illustrates an exemplary filter assembly with the filter assembly access panel or door detached. The filter assembly may have an input connector or port which may receive liquid waste from the galley when attached to a galley basin. The connector or port may be cylindrically shaped with a flange or nub 502 to aid in connecting and maintaining a seal with a basin. The input connector or port may penetrate into a cavity 503 of the body of the filter assembly, allowing liquid waste to flow into the filter assembly. A portion of the input connector or port may penetrate into the cavity 503 and may have a slot or flange 504 for securing a filter or strainer.

The filter assembly may have a second or emergency output connector or port 506 in addition to the first or main output port 103, which may be used to connect to the galley's waste plumbing, thus allowing for wastewater to pass through the filter assembly. The first or main output connector or port 103 may have a flange 507 for aiding in a watertight seal with the galley's waste plumbing system.

The second output connector or port 506 may be used to drain or empty the filter assembly when there is a clog. The second output port 506 may also have a valve 508 for opening or closing the second output connector or port 506. In case of a clog outside of or beyond the filter assembly, a user may bypass the waste plumbing system and use output port 506 as an emergency drain, but still filter wastewater through the filter assembly. The second output connector or port may also be used to permit insertion of one or more tools within the cavity of the body of the filter assembly to break up clogs within the cavity, or to pre-drain the cavity 503 before opening the access panel or door. The filter assembly body may also have one or more holes 509 for removably receiving fasteners such as screws or bolts for removably attaching a movable or removable access panel or door of the filter assembly.

It will be apparent from the foregoing that while particular forms of the invention have been illustrated and described, various modifications can be made without departing from the spirit and scope of the present invention. Accordingly, it is not intended that the invention be limited but rather all modifications and substitutions that would be recognized by one of ordinary skill in the art are intended to be included in the scope of the invention.

I claim:

1. An apparatus for filtering liquid waste comprising:
A filter assembly body having a cavity for receiving liquid waste;
An access panel movably attached to the filter assembly body for movably covering and sealing a portion of the filter assembly body, wherein the access panel includes a window made of a clear material that provides a view within the cavity;
An input port removably connected to the filter assembly body, said input port having a first end and a second end, the first end of the input port being configured to receive the liquid waste;
A strainer configured to be received in the cavity of the filter assembly body and configured to strain the liquid waste, the second end of the input port being inserted into the strainer and configured to release the liquid waste into the strainer;
A main output port connected to the filter assembly body and the cavity of the filter assembly body; and
Wherein the access panel extends between the input port and the output port along a majority of a length of the filter assembly body.

2. The apparatus of claim 1 wherein the strainer includes a buoyant ball.

3. The apparatus of claim 1 wherein the strainer attaches to the access panel.

4. The apparatus of claim 1 further comprising an emergency output port for draining the cavity, the emergency output port having a valve.

5. An apparatus for filtering liquid waste comprising:
A filter assembly body having a cavity;
An input port removably connected to the filter assembly body and the cavity of the filter assembly body, said input port having a first end and a second end, the first end of the input port being configured to receive the liquid waste;
A filter configured to be received in the cavity of the filter assembly body to filter the liquid waste, the second end of the input port being inserted into the filter and configured to release the liquid waste into the filter;
A main output port connected to the filter assembly body and the cavity of the filter assembly body;
An emergency output port connected to the filter assembly body and the cavity of the filter assembly body for draining the cavity; and An access panel removably attached to said filter assembly body for covering and sealing a portion of the cavity of the filter assembly body, the access panel including a window made of a clear material that provides a view within the cavity, wherein the access panel extends between the input port and the output port along a majority of a length of the filter assembly body.

6. The apparatus of claim 5, wherein said access panel comprises a door movably secured to the filter assembly body.

7. The apparatus of claim 5, wherein said access panel comprises a panel removably secured to the filter assembly body.

8. The apparatus of claim 5, wherein said filter comprises a flange configured to receive the input port of the filter assembly.

9. The apparatus of claim 5, wherein said filter is configured to be removably attached to said access panel.

10. The apparatus of claim 5, wherein said filter comprises a flange configured to attach said filter to the input port of the filter assembly.

11. The apparatus of claim 10, wherein said filter includes a ball valve disposed adjacent to said flanges.

12. The apparatus of claim 11, wherein said ball valve comprises a ball movably contained within a ball cage including holes for filtering debris.

13. The apparatus of claim 12, wherein said ball has a diameter larger than said filter connector.

14. The apparatus of claim 12, wherein said ball is made of a buoyant material.

15. The apparatus of claim 12, wherein said ball has a hollowed center.

16. The apparatus of claim 5, wherein said emergency output port includes a valve.

* * * * *